United States Patent
Azizi et al.

(10) Patent No.: US 9,571,256 B2
(45) Date of Patent: Feb. 14, 2017

(54) SYSTEMS, METHODS, AND DEVICES FOR ALLOCATING OFDMA SUBCHANNELS WITHOUT STRADDLING DIRECT CURRENT

(71) Applicant: Intel Corporation, Santa Clara, CA (US)

(72) Inventors: Shahrnaz Azizi, Cupertino, CA (US); Robert Stacey, Portland, OR (US); Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 14/582,774

(22) Filed: Dec. 24, 2014

(65) Prior Publication Data

US 2016/0105271 A1    Apr. 14, 2016

Related U.S. Application Data (60) Provisional application No. 62/061,639, filed on Oct. 8, 2014.

(51) Int. Cl.
*H04L 5/00* (2006.01)

(52) U.S. Cl.
CPC ........... *H04L 5/0058* (2013.01); *H04L 5/0007* (2013.01); *H04L 5/0037* (2013.01)

(58) Field of Classification Search
CPC ..... H04L 5/0058; H04L 5/0007; H04L 5/0037
USPC .................................. 370/328, 329
See application file for complete search history.

(56) References Cited

U.S. PATENT DOCUMENTS

| | | |
|---|---|---|
| 2005/0195909 A1 | 9/2005 | Hwang et al. |
| 2005/0254457 A1 | 11/2005 | Jung et al. |
| 2007/0248046 A1 | 10/2007 | Khan |
| 2010/0246378 A1* | 9/2010 | Vujcic ................... H04L 5/0044 370/210 |
| 2011/0255620 A1 | 10/2011 | Jones, IV et al. |
| 2014/0369276 A1* | 12/2014 | Porat ....................... H04L 5/003 370/329 |
| 2015/0365947 A1* | 12/2015 | Suh ........................ H04L 5/0007 370/208 |

FOREIGN PATENT DOCUMENTS

WO    2012051319 A1    4/2012

OTHER PUBLICATIONS

International Search Report received in Application No. PCT/US2015/051241; mailed on Jan. 6, 2016; 11 pages.
Search Report for Taiwanese Patent Application No. 104128792 completed Nov. 14, 2016, 2 pages (1 page translation of Search Report).

* cited by examiner

*Primary Examiner* — Ronald B Abelson
(74) *Attorney, Agent, or Firm* — Sutherland Asbill & Brennan LLP (57) ABSTRACT

Example systems, methods, and devices for reusing one or more architectural building blocks of IEEE 802.11 n/ac/ah network, and allocating one or more Orthogonal Frequency-Division Multiple Access (OFDMA) tones such that the one or more OFDMA allocations have fixed locations which do not straddle DC are disclosed.

26 Claims, 10 Drawing Sheets

FIG. 1

|  | 2.4 GHz | | 5GHz | | | |
| --- | --- | --- | --- | --- | --- | --- |
|  | 20MHz | 40MHz | 20MHz | | 40 MHz | 80 MHz |
| FFT size | 256 | 512 | 256 | | 512 | 1024 |
| DC+Edge | 3+11 | 5+11 | <20 MHz allocations: 5+11 For reuse of 242-tone: 3+11 | | 5+11 | 5+11 |
| Usable tones | 242 | 496 | 242 | | 496 | 1008 |

FIG. 2A

| Option 1 | 20 MHz | | 40 MHz | 80 MHz |
|---|---|---|---|---|
| FFT size | 256 | | 512 | 1024 |
| Usable tones | 242 | | 496 | 1008 |
| DC+Edge | 3+11 | 5+11 | 5+11 | 5+11 |
| RUs (data+pilots) | 242 | 30, 56, 120 | 30, 56, 120, 242, 496 | 30, 56, 120, 242, 496, 1008 |
| # allocations of minimum RU | 8 | | 16 | 32 |
| Unused tones with mix of 30, 56, 120 and 242 | 0 to 10 (two 56-tone & one 120-tone) | | 12-22 (95.6% - 97.6% efficient) | 40-54 (94.6% - 96% efficient) |
| Unused tones with 2x496 | - | | - | 16 (98.4% efficient) |

| Option 2 | 20 MHz | 40 MHz | 80 MHz |
|---|---|---|---|
| FFT size | 256 | 512 | 1024 |
| DC+Edge | 5+11 | 5+11 | 5+11 |
| Usable tones | 240 | 496 | 1008 |
| RUs (data+pilots) | 30, 60, 120, 240 | 30, 60, 120, 240, 496 | 30, 60, 120, 240, 496, 1008 |
| # allocations of minimum RU | 8 | 16 | 32 |
| Unused tones with mix of 30, 60, 120 and 240 | 0 | 16 (96.8% efficient) | 48 (95.2% efficient) |
| Unused tones with 2x496 | - | - | 16 (98.4% efficient) |

FIG. 9

SYSTEMS, METHODS, AND DEVICES FOR ALLOCATING OFDMA SUBCHANNELS WITHOUT STRADDLING DIRECT CURRENT

CROSS REFERENCE TO RELATED APPLICATION

This application claims the benefit of U.S. Provisional Patent Application Ser. No. 62/061,639, filed on Oct. 8, 2014, the disclosure of which is incorporated herein by reference.

TECHNICAL FIELD

Embodiments described herein generally relate to wireless networks.

BACKGROUND

A next generation WLAN, IEEE 802.11ax (also referred to as High-Efficiency WLAN (HEW)), is under development. Uplink multiuser MIMO (UL MU-MIMO) and Orthogonal Frequency-Division Multiple Access (OFDMA) are two major features included in the new standard.

DETAILED DESCRIPTION

Example embodiments described herein provide systems, methods, and devices, for allocating Orthogonal Frequency-Division Multiple Access (OFDMA) subchannels without straddling direct current (DC).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Details of one or more implementations are set forth in the accompanying drawings and in the description below. Further embodiments, features, and aspects will become apparent from the description, the drawings, and the claims. Embodiments set forth in the claims encompass all available equivalents of those claims.

The terms "communication station", "station", "handheld device", "mobile device", "wireless device" and "user equipment" (UE), as used herein, refer to a wireless communication device such as a cellular telephone, smartphone, tablet, netbook, wireless terminal, laptop computer, a wearable computer device, a femtocell, High Data Rate (HDR) subscriber station, access point, access terminal, or other personal communication system (PCS) device. The device may be either mobile or stationary.

The term "access point" (AP) as used herein may be a fixed station. An access point may also be referred to as an access node, a base station or some other similar terminology known in the art. An access terminal may also be called a mobile station, a user equipment (UE), a wireless communication device or some other similar terminology known in the art. Embodiments disclosed herein generally pertain to wireless networks. Some embodiments can relate to wireless networks that operate in accordance with one of the IEEE 802.11 standards including the IEEE 802.11ax standard. Other embodiments can relate to determination of communication status. Further, certain embodiments can relate to channel reservation during communication status determination.

Figure 1:
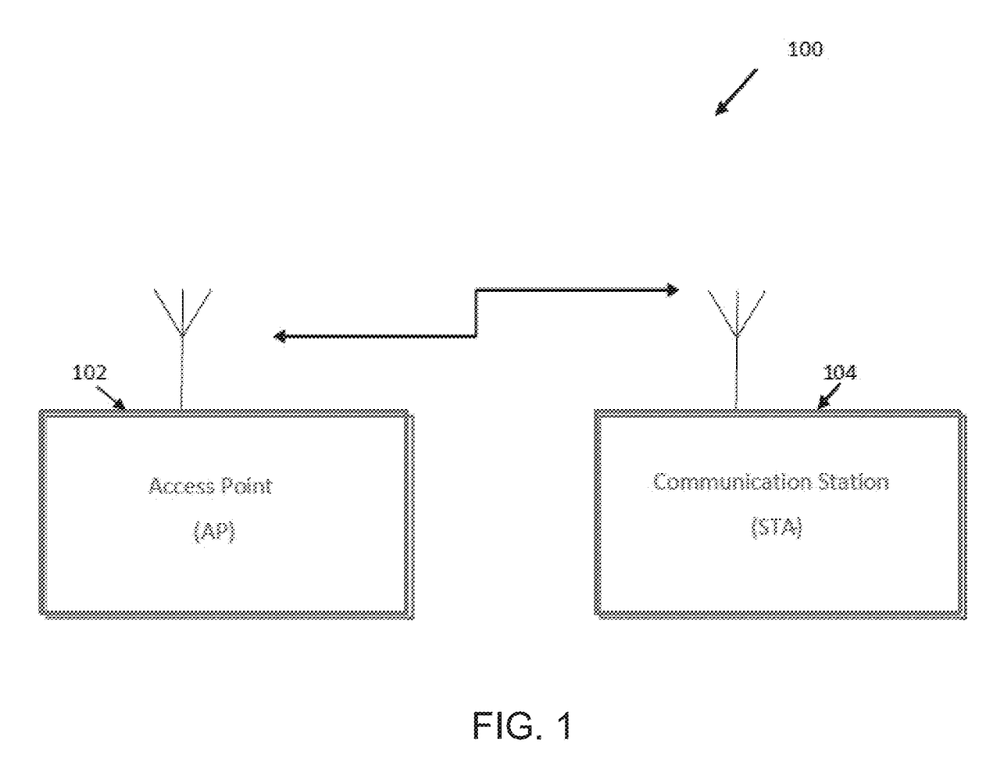
FIG. 1 is a network diagram illustrating an example network environment, according to one or more example embodiments.

FIG. 1 is a network diagram illustrating an example network environment suitable for fine timing measurement (FTM) burst management, according to some example embodiments. Wireless network 100 can include one or more communication stations (STAs) 104 and one or more access points (APs) 102, which may communicate in accordance with IEEE 802.11 communication techniques. The communication stations 104 may be mobile devices that are non-stationary and do not have fixed locations. The one or more APs may be stationary and have fixed locations. The stations may include an AP communication station (AP) 102 and one or more responding communication stations STAs 104.

In accordance with some IEEE 802.11ax (also referred to as High-Efficiency WLAN (HEW)) embodiments, an access point may operate as a master station which may be arranged to contend for a wireless medium (e.g., during a contention period) to receive exclusive control of the medium for an HEW control period (e.g., a transmission opportunity (TXOP)). The master station may transmit an HEW mastersync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique.

The master station may also communicate with legacy stations in accordance with legacy IEEE 802.11 communication techniques. In some embodiments, the master station may also be configurable to communicate with HEW stations outside the HEW control period in accordance with legacy IEEE 802.11 communication techniques, although this is not a requirement.

In other embodiments, the links of an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In certain embodiments, a 320 MHz contiguous bandwidth may be used. In other embodiments, bandwidths of 5 MHz and/or 10 MHz may also be used. In these embodiments, each link of an HEW frame may be configured for transmitting a number of spatial streams.

Although downlink multiuser multiple-input multiple-output (DL MU-MIMO) was introduced to Wi-Fi in 802.11ac, features to prevent reception jamming caused by incorrect channel status assumptions were not addressed. There is no channel reservation scheme for DL MU-MIMO reception in existing Wi-Fi. Additionally, there is no polling scheme known in Wi-Fi for multiuser scheduling. Without protecting the receiver and polling the receiver, the system throughput can be lower than that with the protection/poll by 2× and more for long packets.

In certain of these scenarios, the access point (AP) sees an idle channel and directly sends downlink MU-MIMO data to the scheduled stations (STA) without checking the channel statuses of the STAs. Reception of the DL MU-MIMO data is properly received only if the channel statuses of the access point (AP) and the receive station (STA) are identical. If the AP sees an idle channel but the scheduled communication station STA 104 does not, the downlink reception at the communication station STA 104 is subject to interference, similar to interference resulting from transmitting a data packet without RTS/CTS protection in legacy Wi-Fi. Transmission of short packets may not result in interference. However, for long packets such as the aggregated packets having about 3-4 micro-seconds (ms) transmission durations, the throughput without the RTS/CTS protection is much lower than that with the RTS/CTS protection.

Orthogonal Frequency-Division Multiple Access (OFDMA) is another feature of 802.11ax. OFDMA can experience reception jamming if the AP 102 does not know the clear channel assessment (CCA) status of the communication station STA 104 or the STA does not reserve the channel for receiving long packets. Certain methods and devices for allocating OFDMA subchannels in 802.11ax HEW without straddling DC are detailed in FIGS. 2A to 7, for example.

Example embodiments of certain systems, methods, and devices may include an OFDMA tone allocation design for multi-user operation in 802.11ax (High Efficiency WLAN or HEW). The waveform in the example embodiments of certain systems, methods, and devices may operate with about four times longer symbol duration than existing 802.11 OFDM waveforms, such as, for example, very high throughput (VHT), high throughput (HT) or non-high throughput (non-HT) defined in the existing 802.11 specification. Example embodiments of certain systems, methods, and devices can also provide a flexible resource block allocation method with variable sizes and support 20 MHz and 40 MHz operation in primary channel of 80 MHz BSS. The OFDMA allocations may have fixed locations, which do not straddle DC. The present disclosure details the number of subcarriers assigned in various possible resource blocks that may be arrived at after considering any number of trade-offs, such as, for example, frequency efficiency, reuse of existing 802.11 architectural building blocks, ease of implementation and coexistence with legacy devices. Example embodiments of certain systems, methods, and devices can provide solutions to high density deployment scenarios such as large enterprises, residential buildings and hotspots, for example.

Example embodiments of certain systems, methods, and devices can provide detailed design for various OFDMA allocation sizes for the 1024-point Fast Fourier Transform (FFT) in IEEE 802.11ax 80 MHz bandwidth of operation, for example. The 1024-point FFT may be used with about four times longer symbol duration of IEEE 802.11n/ac and may be applied to both outdoor and indoor environments. In an outdoor environment, about four times longer symbol duration may enable use of a relatively more efficient Cyclic Prefix (CP) to overcome the longer delay spread, and in an indoor environment, it may allow a relatively more relaxed requirement for clock timing accuracy, for example.

Example embodiments of certain systems, methods, and devices can provide a relatively efficient configuration for OFDMA that can optimize use of available bandwidth while allowing operation of 20 MHz and 40 MHz devices in a primary channel of 80 MHz BSS to, for example, enable flexibility of deployment and interference mitigation. Example embodiments of certain systems, methods, and devices may also minimize the number of configurations and OFDMA modes, for example, by designing allocations with fixed locations, which do not straddle DC.

Some proposals in DensiFi SIG have proposed configurations for OFDMA allocation sizes. However, none of these proposals consider MU (multi-user) operation with devices operating on a primary channel. Example embodiments of certain systems, methods, and devices can also provide allocation that does not straddle DC. Example use cases introduced in HEW including targeting high density deployment scenarios and better control over larger bandwidths to be scheduled by a HEW Access Point (AP) may improve the current Wi-Fi system in many ways.

According to one example embodiment, the design of OFDMA tone allocation plan may be as follows. Example methods may provide a 80 MHz waveform design for use in an 80 MHz BSS, in a 20 MHz primary of 40 MHz BSS, in a 20 MHz primary of 80 MHz BSS, in a 40 MHz BSS and in a 20 MHz BSS. Such a waveform can be easily scaled for use in basic service sets (BSS) with 160 MHz or 80+80 MHz channel widths, for example.

Figure 2A:
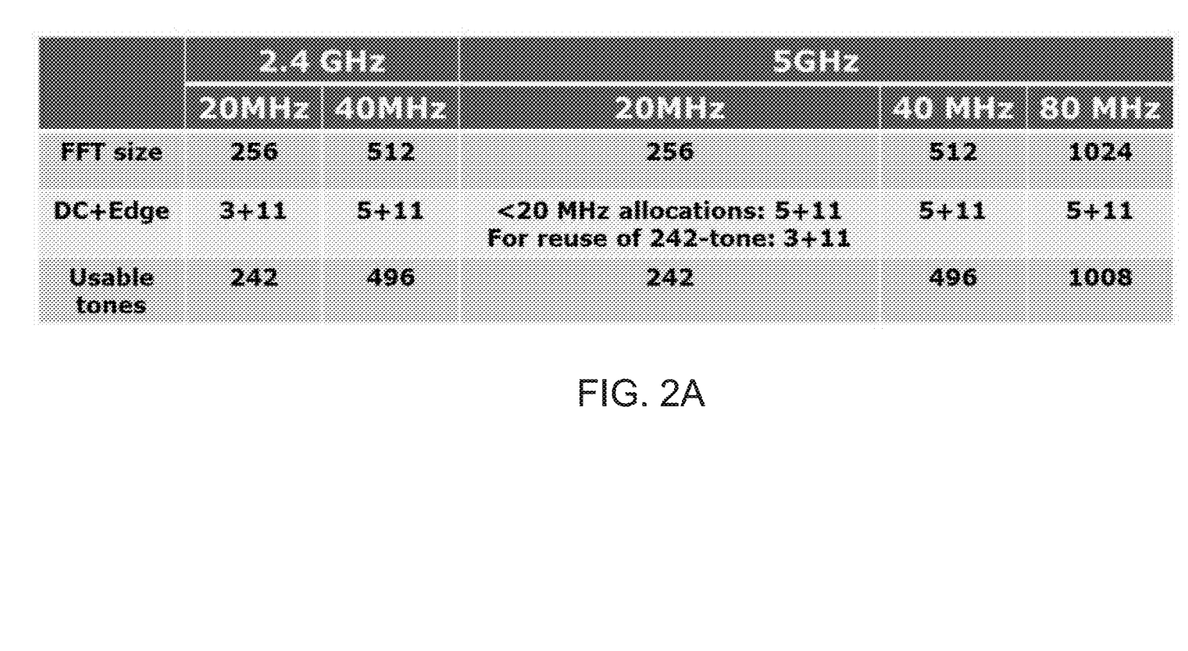
FIG. 2A illustrates total number of usable tones in an IEEE 802.11ax network, according to one or more example embodiments.
Figure 2B:
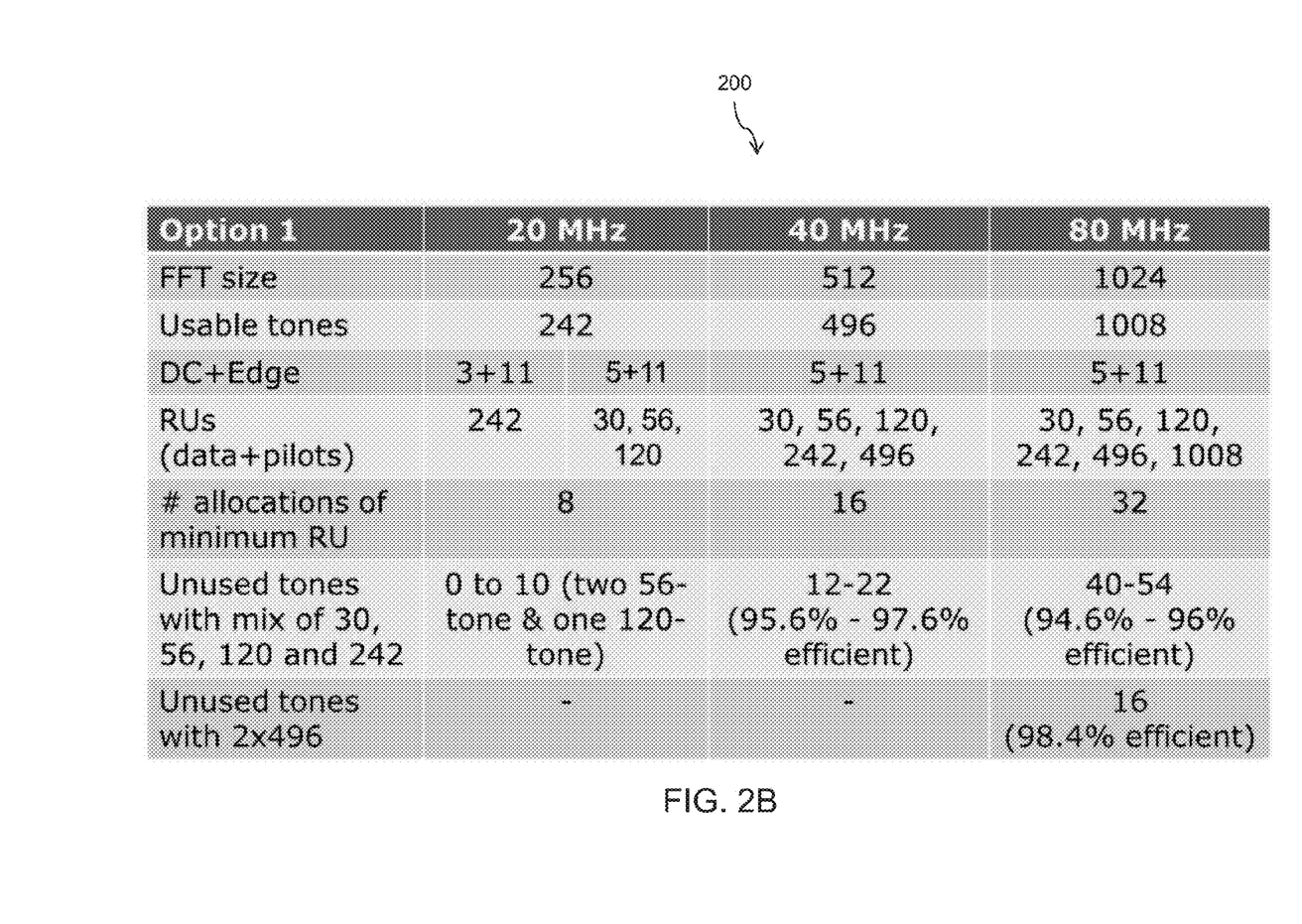
FIG. 2B illustrates a number of Service Resource Units (RUs), number of allocations, and efficiency for each bandwidth of operation, according to one or more example embodiments.

According to one example design, one or more IEEE 802.11ac blocks may be reused as shown in FIG. 2A, for example. In this example, 56-tone and 242-tone blocks of IEEE 802.11ac may be reused. To enable 242-tone allocation in 20 MHz, example embodiments of certain systems, methods, and devices may use 3 nulls at DC. In this case, the receiver may perform DC-offset calibration and tone erasure around DC to reduce the impact of DC-offset when residual carrier frequency may exist. Details of DC-offset calibration and tone erasure may be apparent to one of skill in the art. However, when less than 20 MHz allocations are considered, the transmitter may allocate 5 nulls at DC to reduce tone erasure around DC, which in turn may improve performance. FIG. 2B, for example, summarizes the total number of usable tones 200, according to one or more example embodiments.

Figure 3:
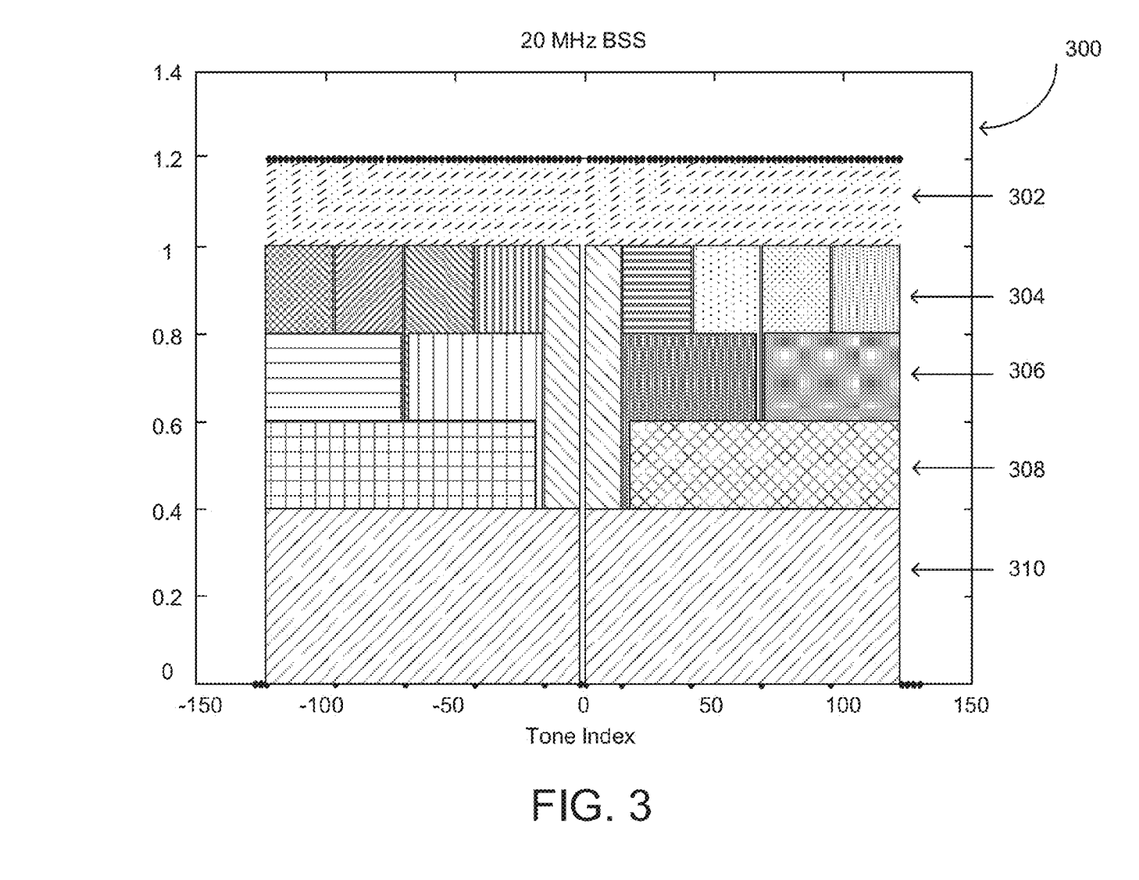
FIG. 3 illustrates an example method for allocating OFDMA subchannels in a wireless network, according to one or more example embodiments.

Turning now to FIG. 3, illustrated is a method 300 for allocating OFDMA subchannels in a 20 MHz wireless network, according to one or more example embodiments. As illustrated, different colors (depicted in various shading and/or cross-hatching) can stand for different allocations to users in this 26-tone illustration. Usable tones 302 are indicated in dotted grey lines in the top row. The next row may have nine 26-tone allocations 304, for example, navy blue, pink, reddish/brownish, turquoise, green, yellow, orange/brownish, black, and grey. The third row may have four 52-tone allocations 306, and one 26-tone allocation, for example, olive, beige, 26-tone-green, brown, and orange. The next row may have two 104-tone allocations 308, and one 26-tone allocation, for example, blue, green, and reddish/brownish. The last row may have one 242-tone allocation 310, according to the design shown in FIG. 2B.

Figure 4:
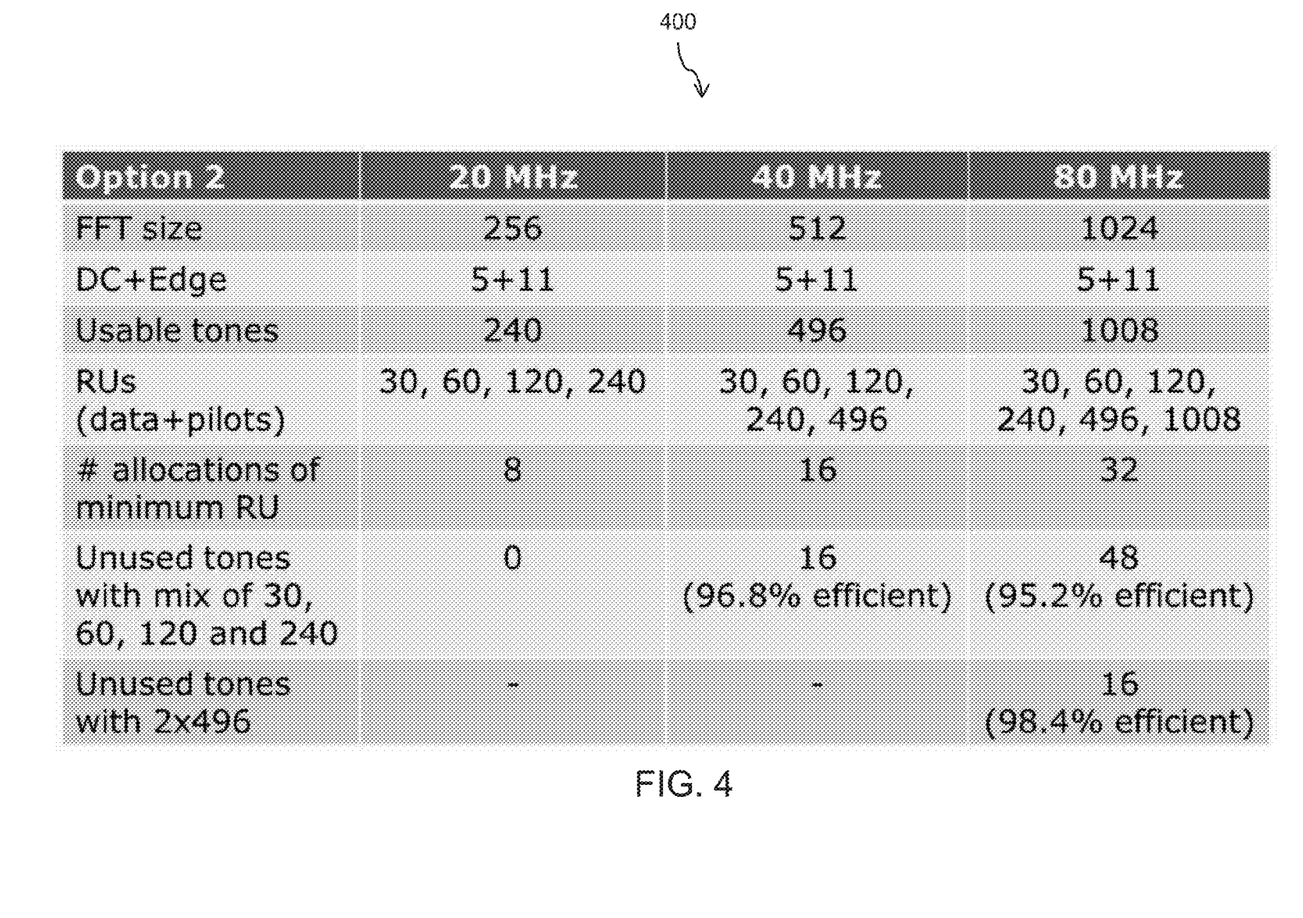
FIG. 4 illustrates a number of Service Resource Units (RUs), number of allocations, and efficiency for each bandwidth of operation, according to one or more example embodiments.

In one example embodiment, instead of the 56-tone and 242-tone blocks that may be reused from the IEEE 802.11ac architecture, new modes such as, 30, 120, 496, and 1008 tones may be defined. FIG. 4, for example, summarizes Resource Units (RUs), number of allocations, and efficiency for each bandwidth of operation, according to one or more example embodiments. This example may consider 5 nulls at DC consistently across frequency bands 2.4 GHz and 5 GHz, and across 20, 40 and 80 MHz bandwidth.

Figure 5:
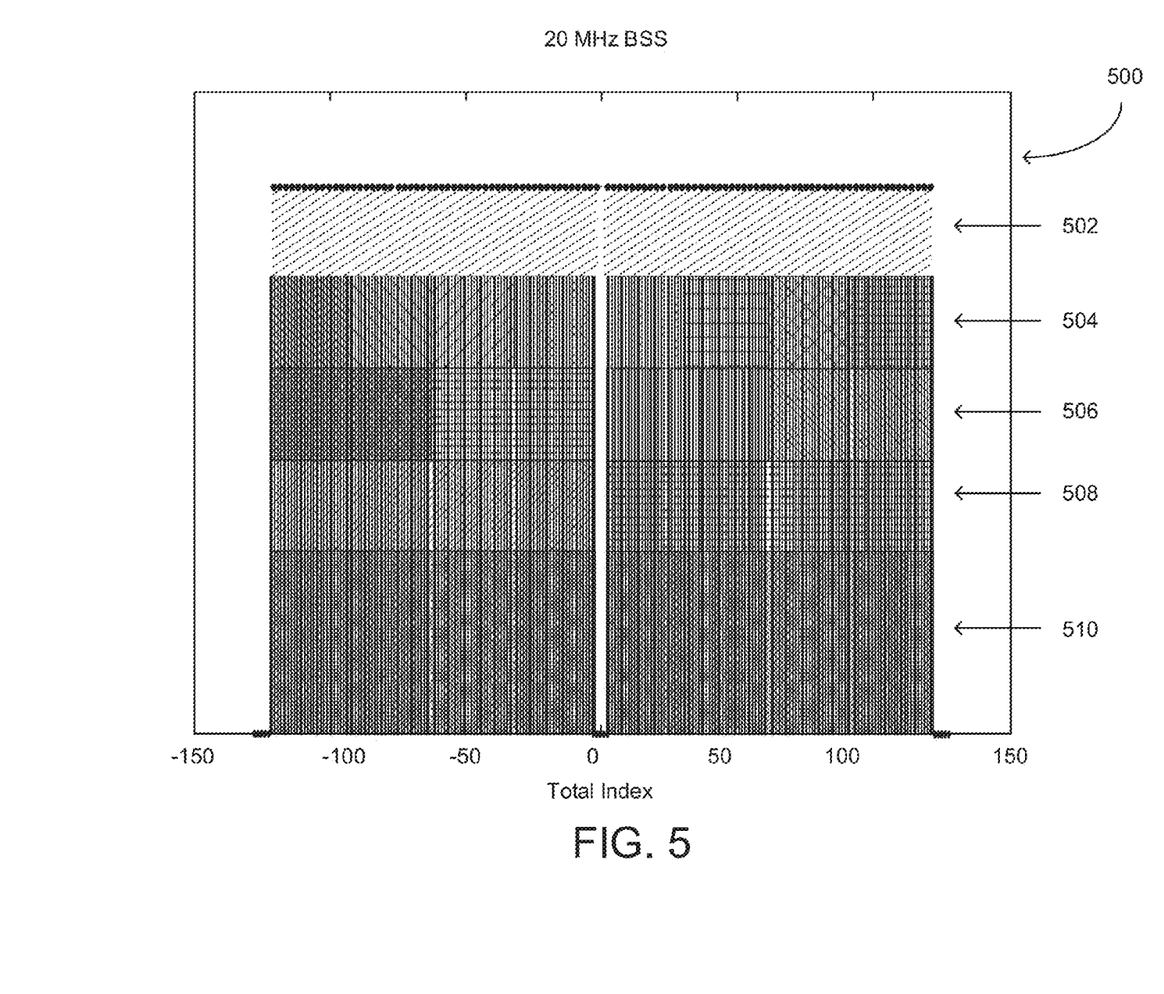
FIG. 5 illustrates an example method for allocating OFDMA subchannels in a wireless network, according to one or more example embodiments.
Figure 6:
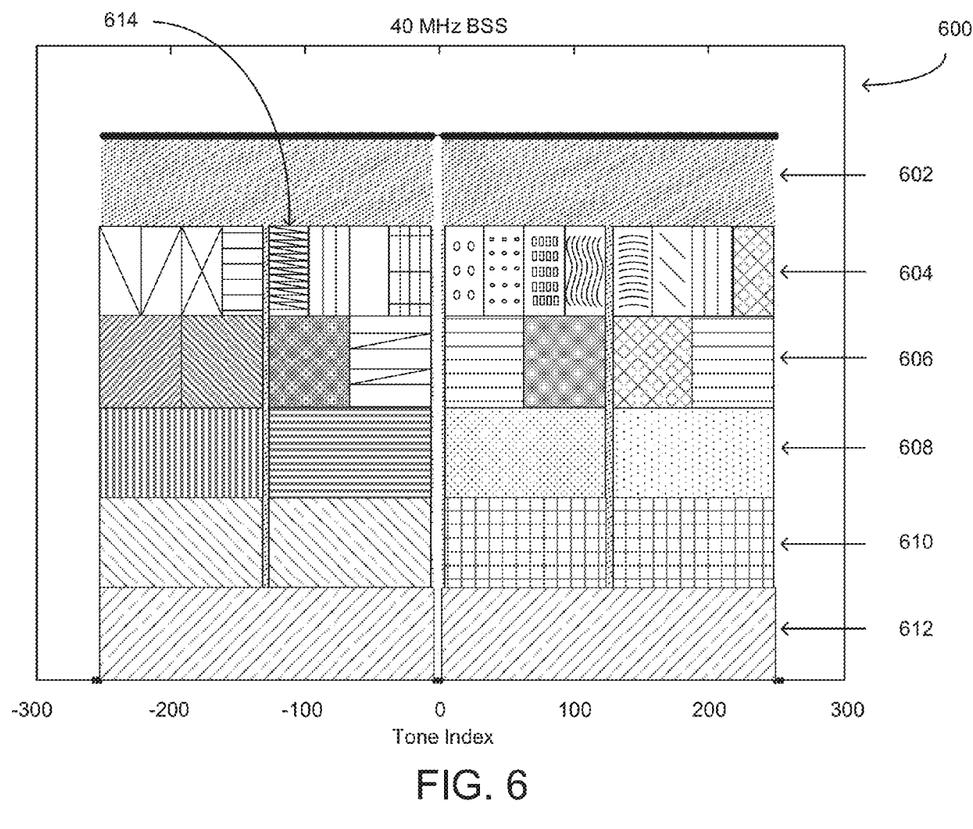
FIG. 6 illustrates an example method for allocating OFDMA subchannels in a wireless network, according to one or more example embodiments.
Figure 7:
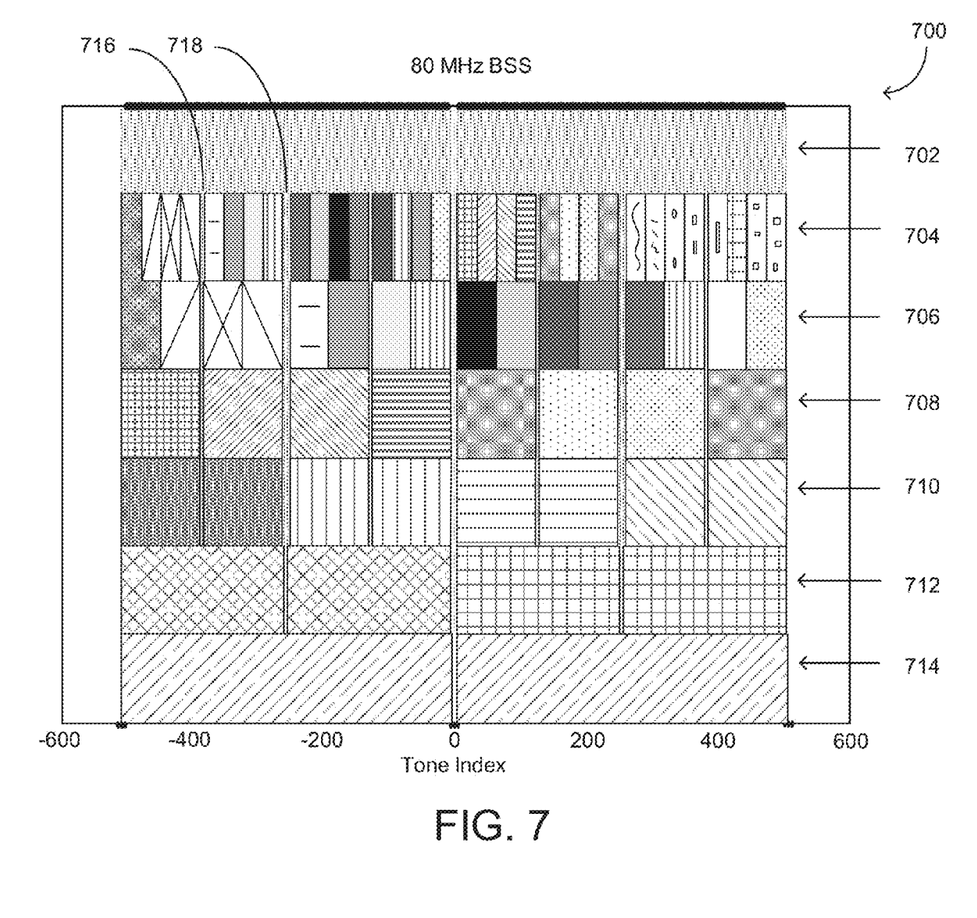
FIG. 7 illustrates an example method for allocating OFDMA subchannels in a wireless network, according to one or more example embodiments.

As explained in the above example embodiments, allocations may be at fixed locations that do not necessarily straddle DC. FIGS. 5-7, for example, illustrate one example design in 20, 40 and 80 MHz BSS. As shown in FIGS. 5-7, for example, there may always be enough nulls to be allocated at DC of 20 MHz BSS, 20 MHz primary channel in 80 MHz BSS, 40 MHz in 80 MHz BSS, and nulls at DC of 80 MHz BSS. It may also be observed that because allocation may be a multiple of power 2 (for example, 60=2×30, and 120=4×30, etc.), any combinations thereof may be easily aligned within a relatively larger bandwidth. It should also be noted that the 30-tone allocation in FIGS. 5-7 can be replaced with a 26-tone allocation or a 28-tone allocation, for example.

Turning now to FIG. 5, a method 500 is shown for allocating OFDMA subchannels in a 20 MHz BSS wireless network, according to one or more example embodiments. As illustrated, different colors (depicted in various shading and/or cross-hatching) can stand for different allocations to users in this multi-tone illustration. Usable tones 502 are indicated in dotted blue lines in the top row. The next row may have eight 30-tone allocations 504, for example. The third row may have four 60-tone allocations 506. The next row may have two 120-tone allocations 508, for example, and the last row may have one 240-tone allocation 510, according to the design shown in FIG. 4.

FIG. 6 illustrates a method 600 for allocating OFDMA subchannels in a 40 MHz BSS wireless network, according to one or more example embodiments. As illustrated, different colors (depicted in various shading and/or cross-hatching) can stand for different allocations to users in this multi-tone illustration. Usable tones 602 are indicated in dotted blue lines in the top row. The next row may have sixteen 30-tone allocations 604, for example. The third row may have eight 60-tone allocations 606. The next row may have four 120-tone allocations 608, for example. The following row may have two 240-tone allocations 610, for example, and the last row may have one 496-tone allocation 612, according to the design shown in FIG. 4. DC nulls for the 20 MHz STAs may be indicated by 614, for example.

FIG. 7 illustrates a method 700 for allocating OFDMA subchannels in a 80 MHz BSS wireless network, according to one or more example embodiments. As illustrated, different colors (depicted in various shading and/or cross-hatching) can stand for different allocations to users in this multi-tone illustration. Usable tones 702 are indicated in dotted blue lines in the top row. The next row may have thirty two 30-tone allocations 704, for example. The third row may have sixteen 60-tone allocations 706. The next row may have eight 120-tone allocations 708, for example. The following row may have four 240-tone allocations 710, for example. The following row may have two 496-tone allocations 712, and the last row may have one 1008-tone allocation, according to the design shown in FIG. 4. DC nulls for the 20 MHz STAs may be indicated by 716, for example, and DC nulls for the 40 MHz STAs may be indicated by 718.

Example embodiments of certain systems, methods, and devices can search for allocation sizes that would best utilize the available 80 MHz bandwidth taking into consideration at least one of the following factors: (1) reuse of IEEE 802.11ac 20/40 MHz and 80 MHz blocks to the extent possible, (2) efficient utilization of 20 and/or 40 MHz bandwidth, (3) enabling 20 MHz operation in the primary channel of 40 MHz BSS, (4) enabling 40 MHz operation in the primary channel of 80 MHz BSS, (5) enabling 40 MHz operation within 80 MHz BSS, (6) minimum number of modes to reduce amount of testing or certifications and to ease implementation complexity, and (7) fixed allocations that do not straddle DC, because if allocations were to straddle DC, then it may have more than one mode or may have a pseudo-mode. For example, considering a 56-tone allocation that sometimes straddles DC and sometimes does not straddle DC, such allocation may really have two different modes or pseudo-modes, for example.

According to one example embodiment, there may be multiple possibilities on how to pick and choose combinations of OFDMA allocation sizes in a given bandwidth. For example, to limit total number of modes, the permutations of RUs may be limited. For example, in a 20 MHz bandwidth, the example embodiments of certain systems, methods, and devices may have eight 30-tone allocations; four 30-tone allocations and two 60-tone allocations; four 30-tone allocations and one 120-tone allocation; four 60-tone allocations; two 60-tone allocations and one 120-tone allocation; or two 120-tone allocations. Multiple options can be used to limit the permutations in wider bandwidths such as limiting the total number of users, and limiting narrow units to the primary channel.

Figure 8:
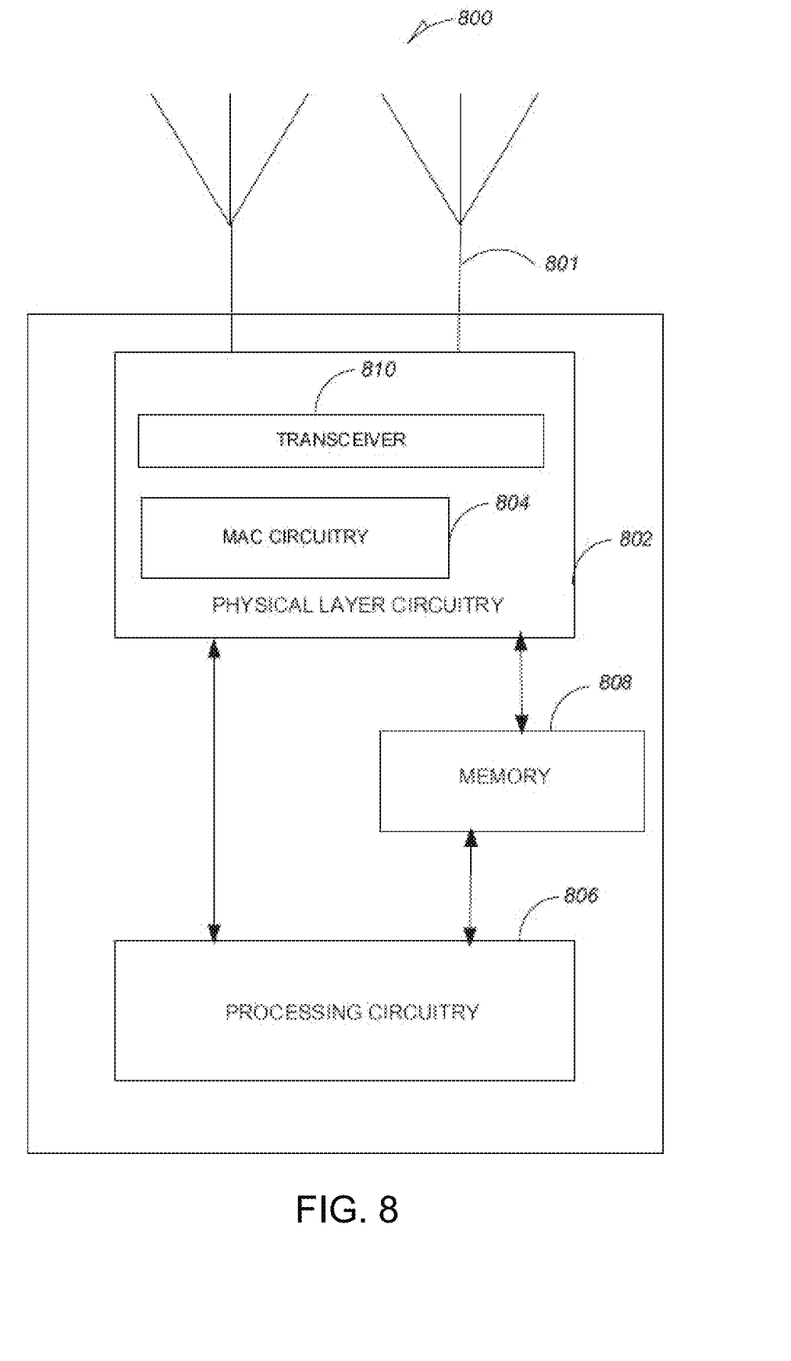
FIG. 8 illustrates a functional diagram of an example communication station or example access point, according to one or more example embodiments.

FIG. 8 shows a functional diagram of an exemplary communication station 800 in accordance with some embodiments. In one embodiment, FIG. 8 illustrates a functional block diagram of a communication station that may be suitable for use as an AP 102 (FIG. 1) or communication station STA 104 (FIG. 1) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include physical layer circuitry 802 having a transceiver 810 for transmitting and receiving signals to and from other communication stations using one or more antennas 801. The physical layer circuitry 802 may also include medium access control (MAC) circuitry 804 for controlling access to the wireless medium. The communication station 800 may also include processing circuitry 806 and memory 808 arranged to perform the operations described herein. In some embodiments, the physical layer circuitry 802 and the processing circuitry 806 may be configured to perform operations detailed in FIGS. 2-6.

In accordance with some embodiments, the MAC circuitry 804 may be arranged to contend for a wireless medium and configure frames or packets for communicating over the wireless medium and the physical layer circuitry 802 may be arranged to transmit and receive signals. The physical layer circuitry 802 may include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the physical layer circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device may, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

Figure 9:
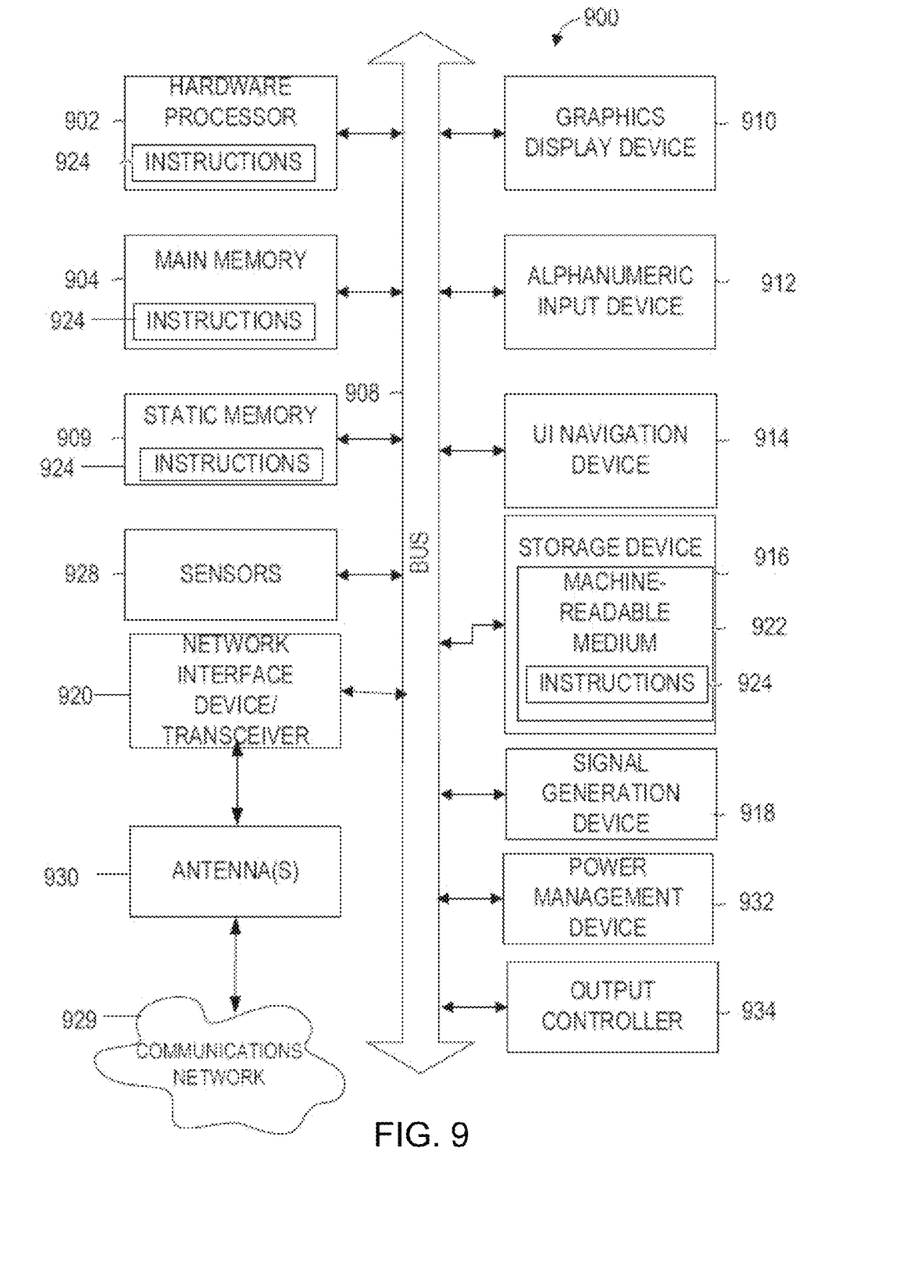
FIG. 9 shows a block diagram of an example machine upon which any of one or more techniques (e.g., methods) according to one or more embodiments discussed herein may be performed.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912 and UI navigation device 914 may be a touch screen display. The machine 900 may additionally include a storage device (i.e., drive unit) 916, a signal generation device 918 (e.g., a speaker), a network interface device/transceiver 920 coupled to antenna(s) 930, and one or more sensors 928, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium includes a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 929 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 929. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible media to facilitate communication of such software.

EXAMPLE EMBODIMENTS

One example embodiment is a method for allocating one or more communication subchannels in a multi-user operation. The method can include reusing, by a first computing device including one or more processors and one or more transceiver components, one or more architectural building blocks of a IEEE 802.11 network, and allocating one or more Orthogonal Frequency-Division Multiple Access (OFDMA) tones such that the one or more OFDMA allocations have fixed locations which do not straddle DC. A waveform in the multi-user operation operates with a 4× longer symbol duration than an existing IEEE 802.11 OFDMA waveform. The one or more OFDMA allocations are sized for a 256-point Fast Fourier Transform (FFT) in a 20 MHz bandwidth network, 512-point FFT in a 40 MHz bandwidth network, and 1024-point FFT in a 80 MHz bandwidth network, for example. The method can also include enabling a 20 MHz operation in a primary channel of 40 MHz Basic Service Sets (BSS), enabling a 20 MHz operation in a primary channel of 80 MHz BSS, enabling a 20 MHz operation in a primary channel of 40 MHz BSS, enabling a 40 MHz operation in a primary channel of 80 MHz BSS, or enabling a 20 MHz, 40 MHz or 80 MHz operation in a primary channel of 160 MHz BSS. In certain instances, one or more OFDMA tone allocations can include nine 26-tone allocations, four 52-tone allocations and one 26 tone allocation, two 104-tone allocations and one 26 tone allocation, and one 242-tone allocation. In other instances, one or more OFDMA tone allocations can include eight 30-tone allocations, four 60-tone allocations, two 120-tone allocations, and one 240-tone allocation. In yet other instances, one or more OFDMA tone allocations can include sixteen 30-tone allocations, eight 60-tone allocations, four 120-tone allocations, two 240-tone allocations, and one 496-tone allocation. In further instances, one or more OFDMA tone allocations can include thirty two 30-tone allocations, sixteen 60-tone allocations, eight 120-tone allocations, four 240-tone allocations, two 496-tone allocations, and one 1008-tone allocation. Although example tone allocations are described above, the embodiments described are not limited as such and may include tone allocations smaller than 30-tone and may include multiples of such tones, for example, 26-tone, 52-tone, and 104-tones.

Another example embodiment is a device for allocating one or more communication subchannels in a multi-user operation. The device can include a transceiver configured to transmit and receive wireless signals, an antenna coupled to the transceiver, one or more processors in communication with the transceiver, at least one memory that stores computer-executable instructions, and at least one processor of the one or more processors configured to access the at least one memory, wherein the at least one processor of the one or more processors is configured to execute the computer-executable instructions to reuse one or more architectural building blocks of a IEEE 802.11 network, and allocate one or more Orthogonal Frequency-Division Multiple Access (OFDMA) tones such that the one or more OFDMA allocations have fixed locations which do not straddle DC. A waveform in said multi-user operation operates with a 4× longer symbol duration than an existing IEEE 802.11 OFDMA waveform. The one or more OFDMA allocations are sized for a 1024-point Fast Fourier Transform (FFT) in a 80 MHz bandwidth network. The device can further enable a 20 MHz operation in a primary channel of 40 MHz Basic Service Sets (BSS), enabling a 20 MHz operation in a primary channel of 80 MHz BSS, enabling a 40 MHz operation in a primary channel of 80 MHz BSS, enabling a 80 MHz operation BSS, or enabling a 20 MHz, 40 MHz or 80 MHz operation in a primary channel of 160 MHz BSS. In certain instances, one or more OFDMA tone allocations can include one 242-tone allocation, as illustrated in FIGS. 2A and 2B, for example. In other instances, one or more OFDMA tone allocations can include eight 30-tone allocations, four 60-tone allocations, two 120-tone allocations, and one 240-tone allocation. In yet other instances, one or more OFDMA tone allocations can include sixteen 30-tone allocations, eight 60-tone allocations, four 120-tone allocations, two 240-tone allocations, and one 496-tone allocation. In further instances, one or more OFDMA tone allocations can include thirty two 30-tone allocations, sixteen 60-tone allocations, eight 120-tone allocations, four 240-tone allocations, two 496-tone allocations, and one 1008-tone allocation. Although example tone allocations are described above, the embodiments described are not limited as such and may include other or similar tone allocations.

Another example embodiment is a non-transitory computer-readable medium. The medium can be configured for storing computer-executable instructions which, when executed by a processor, cause the processor to perform operations including reusing one or more architectural building blocks of a IEEE 802.11 network, and allocating one or more Orthogonal Frequency-Division Multiple Access (OFDMA) tones such that the one or more OFDMA allocations have fixed locations which do not straddle DC. A waveform in said multi-user operation operates with a 4× longer symbol duration than an existing IEEE 802.11 OFDMA waveform. The one or more OFDMA allocations are sized for a 1024-point Fast Fourier Transform (FFT) in a 80 MHz bandwidth network. The operations can also include enabling a 20 MHz operation in a primary channel of 40 MHz Basic Service Sets (BSS), enabling a 20 MHz operation in a primary channel of 80 MHz BSS, enabling a 40 MHz operation in a primary channel of 80 MHz BSS, enabling a 80 MHz operation BSS, or enabling a 20 MHz, 40 MHz or 80 MHz operation in a primary channel of 160 MHz BSS. In certain instances, one or more OFDMA tone allocations can include nine 26-tone allocations, four 52-tone allocations and one 26 tone allocation, two 104-tone allocations and one 26 tone allocation, and one 242-tone allocation. In other instances, one or more OFDMA tone allocations can include eight 30-tone allocations, four 60-tone allocations, two 120-tone allocations, and one 240-tone allocation. In yet other instances, one or more OFDMA tone allocations can include sixteen 30-tone allocations, eight 60-tone allocations, four 120-tone allocations, two 240-tone allocations, and one 496-tone allocation. In further instances, one or more OFDMA tone allocations can include thirty two 30-tone allocations, sixteen 60-tone allocations, eight 120-tone allocations, four 240-tone allocations, two 496-tone allocations, and one 1008-tone allocation. Although example tone allocations are described above, the embodiments described are not limited as such and may include other or similar tone allocations.

While there have been shown, described and pointed out, fundamental novel features of the disclosure as applied to the exemplary embodiments thereof, it will be understood that various omissions and substitutions and changes in the form and details of devices illustrated, and in their operation, may be made by those skilled in the art without departing from the spirit of the disclosure. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A device to allocate one or more communication subchannels in a multi-user operation, the device comprising:
one or more processors including circuitry, the circuitry having logic to:
reuse one or more architectural building blocks configured to allow operation of the device in a legacy wireless network;
allocate one or more orthogonal frequency division multiple access (OFDMA) tones such that the one or more OFDMA tone allocations have fixed locations that do not straddle direct current; and
generate a waveform based at least in part on the one or more OFDMA tone allocations corresponding to at least two basic service sets (BSSs).

2. The device of claim 1, wherein a waveform symbol duration of the waveform is four times longer than a legacy OFDMA waveform symbol duration.

3. The device of claim 1, wherein the one or more OFDMA allocations are sized for a 1024-point Fast Fourier Transform (FFT) in a 80 MHz bandwidth network.

4. The device of claim 1, wherein the logic is to enable at least one of:

a 20 MHz operation in a primary channel of a 40 MHz Basic Service Set (BSS), a 20 MHz operation in a primary channel of a 80 MHz BSS, a 40 MHz operation in a primary channel of a 80 MHz BSS, a 20 MHz, a 40 MHz, and a 80 MHz operation BSS, or a 20 MHz, 40 MHz or 80 MHz operation in a primary channel of a 160 MHz BSS.

5. The device of claim 1, wherein the one or more OFDMA tone allocations comprise one or more 26-tone allocations, one or more 242-tone allocations, one or more 496-tone allocations, or one or more 1008-tone allocations.

6. The device of claim 1, wherein the one or more OFDMA tone allocations comprise eight 30-tone allocations, four 60-tone allocations, two 120-tone allocations, and one 240-tone allocation.

7. The device of claim 1, wherein the one or more OFDMA tone allocations comprise sixteen 30-tone allocations, eight 60-tone allocations, four 120-tone allocations, two 240-tone allocations, and one 496-tone allocation.

8. The device of claim 1, wherein the one or more OFDMA tone allocations comprise thirty two 30-tone allocations, sixteen 60-tone allocations, eight 120-tone allocations, four 240-tone allocations, two 496-tone allocations, and one 1008-tone allocation.

9. The device of claim 1, further comprising:
a transceiver configured to transmit and receive wireless signals; and
at least one memory that stores computer-executable instructions.

10. The device of claim 9, further comprising:
at least one antenna coupled to the transceiver; and
the one or more processors are in communication with the transceiver.

11. A method to allocate one or more communication subchannels in a multi-user operation, the method comprising:
reusing, by a first computing device comprising one or more processors and one or more transceiver components, one or more architectural building blocks configured to allow operation of the first computing device in a legacy wireless network;
allocating one or more orthogonal frequency division multiple access (OFDMA) tones such that the one or more OFDMA tone allocations have fixed locations that do not straddle direct current; and
generating a waveform based at least in part on the one or more OFDMA tone allocations corresponding to at least two basic service sets (BSSs).

12. The method of claim 11, wherein a waveform symbol duration of the waveform is four-times longer than a symbol duration of a legacy OFDMA waveform.

13. The method of claim 11, wherein the one or more OFDMA allocations are sized for a 1024-point Fast Fourier Transform (FFT) in a 80 MHz bandwidth network.

14. The method of claim 11, further comprising enabling at least one of: a 20 MHz operation in a primary channel of a 40 MHz Basic Service Set (BSS), a 20 MHz operation in a primary channel of a 80 MHz BSS, a 40 MHz operation in a primary channel of a 80 MHz BSS, a 20 MHz, a 40 MHz, and a 80 MHz operation BSS, or a 20 MHz, 40 MHz or 80 MHz operation in a primary channel of 160 MHz BSS.

15. The method of claim 11, wherein the one or more OFDMA tone allocations comprise one or more 26-tone allocations, one or more 242-tone allocations, one or more 496-tone allocations, or one or more 1008-tone allocations.

16. The method of claim 11, wherein the one or more OFDMA tone allocations comprise eight 30-tone allocations, four 60-tone allocations, two 120-tone allocations, and one 240-tone allocation.

17. The method of claim 11, wherein the one or more OFDMA tone allocations comprise sixteen 30-tone allocations, eight 60-tone allocations, four 120-tone allocations, two 240-tone allocations, and one 496-tone allocation.

18. The method of claim 11, wherein the one or more OFDMA tone allocations comprise thirty two 30-tone allocations, sixteen 60-tone allocations, eight 120-tone allocations, four 240-tone allocations, two 496-tone allocations, and one 1008-tone allocation.

19. A non-transitory computer-readable medium storing computer-executable instructions which, when executed by a processor, cause the processor to perform operations comprising:
reusing one or more architectural building blocks configured to allow operation of the processor in a legacy wireless network; and
allocating one or more orthogonal frequency division multiple access (OFDMA) tones such that the one or more OFDMA tone allocations have fixed locations that do not straddle direct current; and
generating a waveform based at least in part on the one or more OFDMA tone allocations corresponding to at least two basic service sets (BSSs).

20. The medium of claim 19, further comprising: generating a waveform with a symbol duration that is four times longer than an IEEE 802.11 OFDMA waveform symbol duration.

21. The medium of claim 19, wherein the one or more OFDMA allocations are sized for a 1024-point Fast Fourier Transform (FFT) in a 20 MHz, 40 MHz, or 80 MHz bandwidth network.

22. The medium of claim 19, further comprising enabling at least one of: a 20 MHz operation in a primary channel of a 40 MHz Basic Service Set (BSS), a 20 MHz operation in a primary channel of a 80 MHz BSS, a 40 MHz operation in a primary channel of a 80 MHz BSS, a 20 MHz, a 40 MHz, and a 80 MHz operation BSS, or a 20 MHz, 40 MHz or 80 MHz operation in a primary channel of a 160 MHz BSS.

23. The medium of claim 19, wherein the one or more OFDMA tone allocations comprise one or more 26-tone allocations, one or more 242-tone allocations, one or more 496-tone allocations, or one or more 1008-tone allocations.

24. The medium of claim 19, wherein the one or more OFDMA tone allocations comprise eight 30-tone allocations, four 60-tone allocations, two 120-tone allocations, and one 240-tone allocation.

25. The medium of claim 19, wherein the one or more OFDMA tone allocations comprise sixteen 30-tone allocations, eight 60-tone allocations, four 120-tone allocations, two 240-tone allocations, and one 496-tone allocation.

26. The medium of claim 19, wherein the one or more OFDMA tone allocations comprise thirty two 30-tone allocations, sixteen 60-tone allocations, eight 120-tone allocations, four 240-tone allocations, two 496-tone allocations, and one 1008-tone allocation.

* * * * *

UNITED STATES PATENT AND TRADEMARK OFFICE
CERTIFICATE OF CORRECTION

PATENT NO. : 9,571,256 B2
APPLICATION NO. : 14/582774
DATED : February 14, 2017
INVENTOR(S) : S. Azizi et al.

Page 1 of 1

It is certified that error appears in the above-identified patent and that said Letters Patent is hereby corrected as shown below:

In the Specification

Column 7, Line 36, please change "device may," to -- device, --
Column 9, Line 16, please change "906" to -- 909 --
Column 9, Line 41, please change "906" to -- 909 --
Column 9, Line 45, please change "906" to -- 909 --

In the Claims

Column 12, Line 56 (Claim 1, Line 12), please change "current; and" to -- current, wherein at least one null is associated with the direct current; and --
Column 13, Line 45 (Claim 11, Line 12), please change "current; and" to -- current, wherein at least one null is associated with the direct current; and --
Column 14, Line 26 (Claim 19, Line 11), please change "current; and" to -- current, wherein at least one null is associated with the direct current; and --

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*